Dec. 2, 1958 K. K. STOHSNER 2,862,668
COMBINATION HAY AND GRAIN MILL
Filed May 31, 1955 2 Sheets-Sheet 1

INVENTOR.
KURT K. STOHSNER
BY
Townsend, Townsend and Hoppe
ATTORNEYS

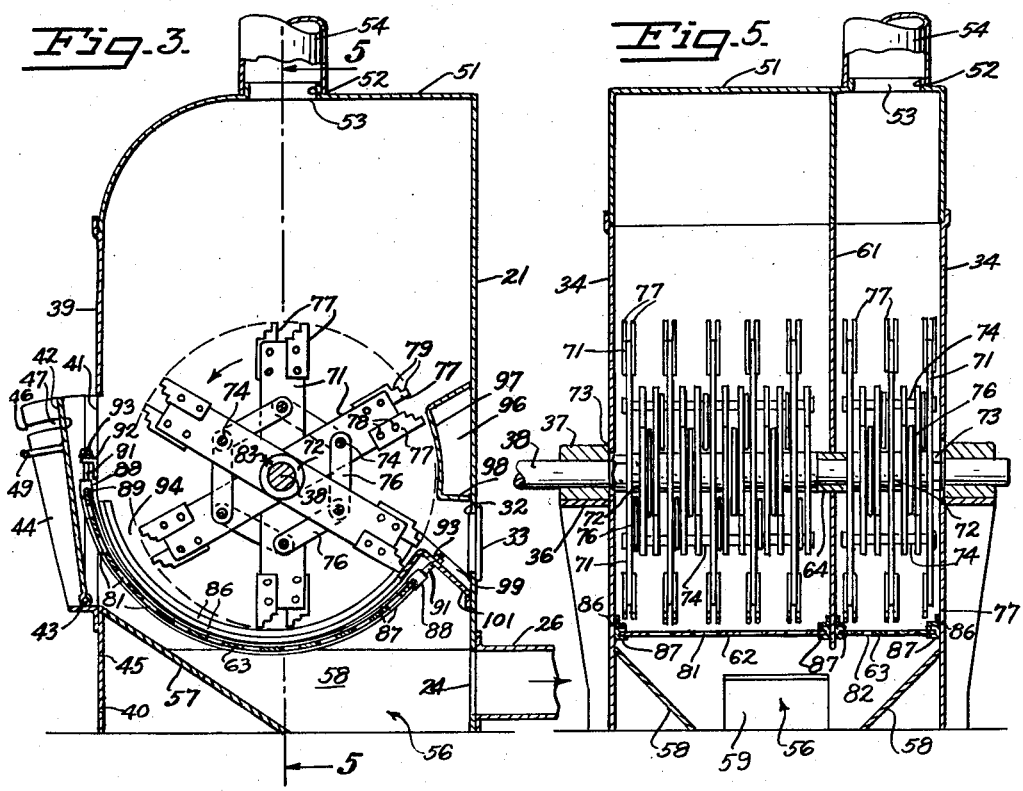
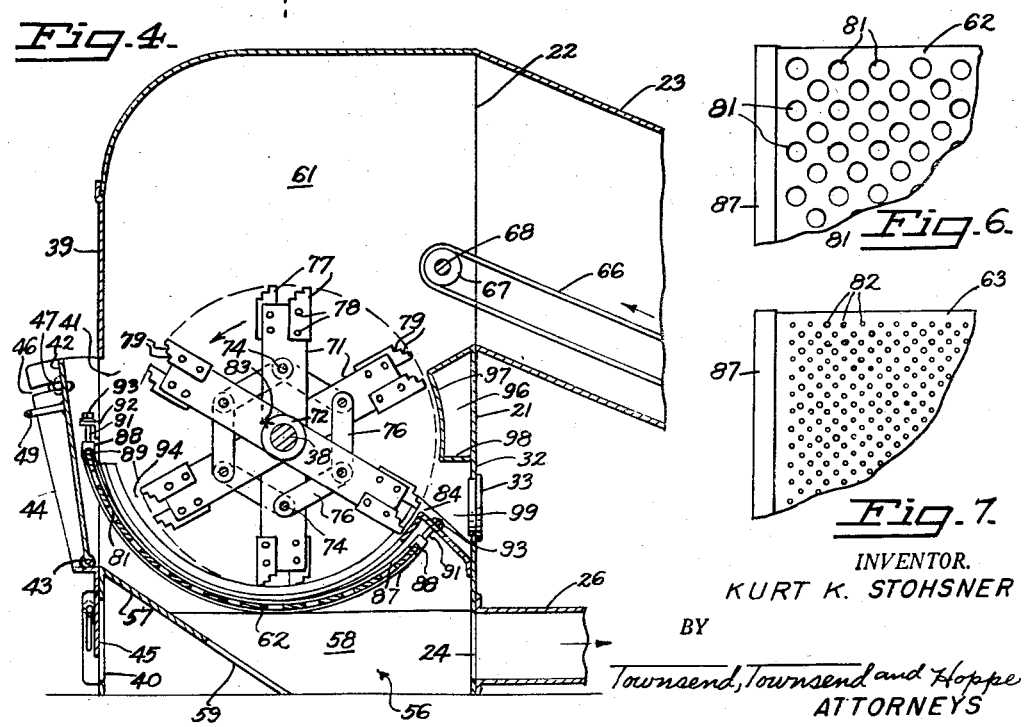

United States Patent Office 2,862,668
Patented Dec. 2, 1958

2,862,668

COMBINATION HAY AND GRAIN MILL

Kurt K. Stohsner, Napa, Calif., assignor to Stohsner Machine Works, Napa, Calif., a partnership Application May 31, 1955, Serial No. 512,171

4 Claims. (Cl. 241—138)

This invention relates to a new and improved hay and grain mill, wherein is provided on a single shaft a hay mill and a grain mill discharging into a common hopper in which the hay and grain are mixed together.

At the present time, separate mills are used to prepare hay and grain for cattle feed, because of the fact that the particle size differs for the hay and grain, being in the case of hay about 1½ inches and in the case of grain, ¼ inch. Accordingly, separate mills, motors and drives are required and separate conveying equipment to convey the products away from the mills to storage bins. The present invention simplifies the operation and reduces the number of pieces of equipment required, inasmuch as a single motor is required to drive both the hay portion and the grain portion of the mill. Reduction in the amount of equipment not only reduces the cost thereof, but also reduces the amount of space required for the equipment.

Under present common practice, after the hay and grain have been separately milled and stored, it is necessary to mix the hay and grain in proper proportion for the feed. Thus, mixing equipment becomes an essential part of present-day practice. In accordance with the present invention, the hay and grain are mixed immediately after milling in the common hopper into which the two portions of the mill discharge, thereby eliminating the necessity of providing separate equipment.

Accordingly one of the principal objects of the present invention is to provide two hammer mills on a single rotatable shaft in a common housing and to provide a partition between the two mills and above the screens therefor, there being separate screens of the proper screen size for each part of the mill. The partition is so located that the proportion of ingredients is in the proper ratio.

A further feature of the invention is the fact that the two screens, which are of separate size, are individually mounted and each is adjustable relative to the mill independently of the other. Mounting means is provided for each screen by which the clearance between the mill and the screen may be manually adjusted.

Still another object of the invention is the provision of an anvil placed to intercept metal particles carried around in the mill and divert the same into a metal trap which is accessible for clean-out purposes.

Other objects of the present invention will become apparent upon reading the following specification and referring to the accompanying drawings in which similar characters of reference represent corresponding parts in each of the several views.

In the drawings:

Fig. 3 is a vertical section taken substantially along the line 3—3 of Fig. 1;

Fig. 4 is a vertical section taken substantially along the line 4—4 of Fig. 1;

Fig. 5 is a vertical section taken substantially along the line 5—5 of Fig. 3;

Fig. 6 is a fragmentary enlarged elevation of a screen in the hay portion of the mill;

Fig. 7 is a fragmentary enlarged elevation of a screen in the grain part of the mill.

Figures 1, 2:
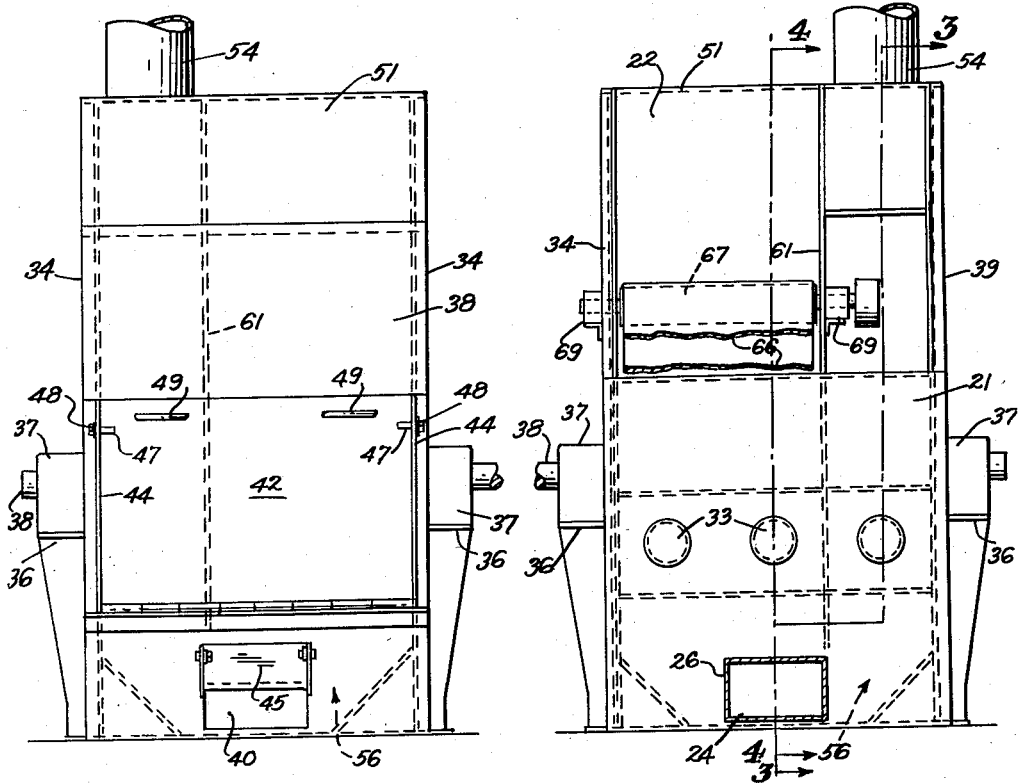
Fig. 1 is a front elevation of the device partly broken away in section.
Fig. 2 is a rear elevation.
Figure 8:
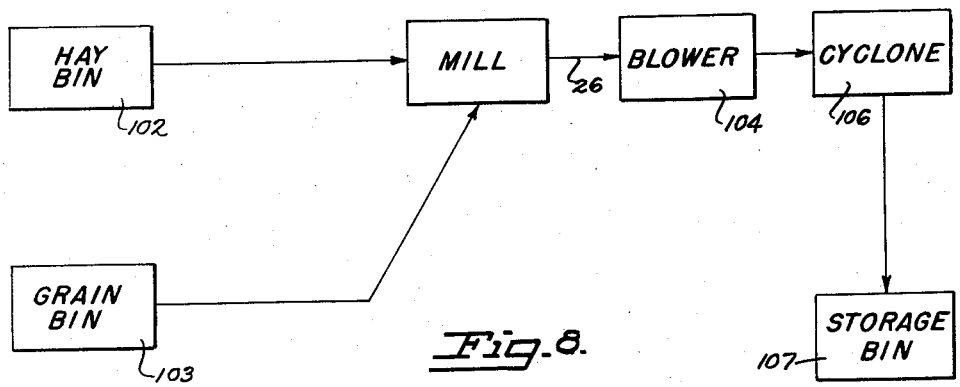
Fig. 8 is a schematic flow sheet showing the flow of material through the machine and associated machines.

The present invention is distinguished by the use of a single casing to include both a hay mill and a grain mill. The casing has a front 21 which is formed with an aperture 22 near the top in registry with the upper end of conveyor housing 23 through which the hay is transported to the mill. The front also has a rectangular, centrally disposed aperture 24 at the bottom through which the mixed milled product is discharged by means of conduit 26. Elevated above the discharge opening 24 is a plurality of clean-out holes 32 from which metal trapped in the machine is removed, which holes may be enclosed by covers 33. Each of the sides 34 of the mill is apertured for the main shaft 38 of the mill and is provided with brackets 36 supporting the pillow blocks 37 in which the main shaft 38 is journalled. The back 39 of the casing is formed with a vent 41 which adjusts the amount of air drawn into the casing. For such purpose, the flap 42 of the vent is hinged to back 39 by piano-type hinge 43 adjacent the bottom. A pair of outwardly extending sectors 44 are positioned on either side of vent 41 and formed with an arcuate slot 46. A bolt 47 is attached to each side of flap 42 and extends through adjacent slot 46 and is provided with a nut 48 which may be tightened to secure the flap 42 in proper position of adjustment. Movement of the flap 42 when the nuts 48 are loosened is accomplished by means of a handle 49. A clean-out vent 40 is located immediately below vent 41 and is provided with a vertically sliding closing gate 45.

The top 51 of the casing is rounded at the rear and is formed with a circular collar 52 surrounding an aperture 53 through which the grain is delivered to the grain side of the machine through the grain conduit 54 which is joined to collar 52.

The bottom of the casing provides a hopper 56 in which the milled product is received. In order to facilitate flow of the product, the hopper is formed with a downwardly-forwardly sloping bottom 57 at the rear and an inwardly-downwardly sloping hopper side on each side. Accordingly the rear and side sloping portions 58 collect the milled product and direct it forwardly through the discharge aperture 24. A portion of sloping bottom 57 is cut out, as indicated by reference numeral 59 in horizontal registry with cleanout vent 40 to afford access to the hopper 56 through vent 40 when gate 45 is raised.

A distinguishing feature of the invention is the provision of a vertically disposed partition 61 which extends from front to back of the casing and from the top down to a position slightly below the screens 62, 63 hereinafter described in detail. The partition 61 is spaced at a position approximately one-third of the width of the casing dividing the casing into major and minor portions or hay and grain portions, respectively. The grain delivery aperture 53 is on the minor side of partition 61 and the hay delivery aperture 22 on the major side. To facilitate separation of the two portions of the casing above the level of the screens 62, 63, a collar 64 surrounds main shaft 38 where it extends through the partition 61, which collar 64 is fixed to the shaft to prevent grain or hay passing from one side to the other.

Hay is delivered to the hay opening 22 by means of a draper 66 mounted in hay delivery conveyor housing 23 which is substantially rectangular in cross-section and registers with the rectangular hay opening 22. The upper end of draper 66 is supported by transversely extending pulley 67, the shaft 68 of which is rotatably mounted in pillow blocks 69 fixed to the outsides of the sides 34. Suitable means (not shown) is provided to drive shaft 68 either from the same motor driving shaft 38 or a different motor.

The two parts of the hammer mill are substantially identical. There is provided a plurality of diametrically extending arms 71 which are mounted on main shaft 38 for rotation therewith. Spacing washers 72 are interposed between adjacent arms 71 to hold the same in parallel, aligned position. Each end of the shaft 38 inside the casing is threaded and nuts 73 at opposite ends are tightened to bear against the hammer arms 71 and confine the same in tight, parallel position. The arms 71 are disposed at 60° angular relationship with adjacent arms, as best shown in Figs. 3 and 4. In order to hold the several arms in alignment, transverse rods 74 parallel to shaft 38 extend through holes in the arms 71 approximately at the midpoint between the center of the shaft and the outer extremity of the arms. Spacing links 76 apertured at each end are disposed in chordal position, one of the holes in each link receiving one of the rods 74 and the opposite hole the adjacent rod. Thus the links maintain the hammer arms 71 in proper 60° angular relation. The outer end of each hammer arm carries a pair of hammer heads 77, one head being secured to one side of the hammer arm 71 adjacent the leading edge thereof and the other head 77 being secured to the opposite side of the hammer arm adjacent the trailing edge thereof. Hammer heads 77 are fastened to arms 71 by nuts and bolts 78. The forward or leading edges of the heads 77 are formed with steps 79 to augment the milling action.

Each screen 62, 63 is formed with holes 81, 82 punched in a staggered pattern, best shown in Figs. 6 and 7. Holes 81 in hay screen 62 are about 1½ inches in diameter and holes 82 in the grain screen 63 are approximately ¼ inch diameter. The screens 62, 63 are arcuate and have a center of curvature 83 on a horizontal axis parallel to the axis of shaft 38 and spaced upwardly and rearwardly thereof. The radius of curvature is such that the outer periphery of the hammer heads 77 and the screens coincide at the forward edge 84 of the screens, which is located at approximately a 60° angle, as shown in Figs. 3 and 4. In order to maintain the screens in alignment, screen guides 86 formed of curved angle bars, are attached on the inwardly facing surfaces of sides 34 and partition 61, which guides are rolled to the proper radius of curvature. The screens are formed with reinforcement strips 87 along their margins, the longitudinal reinforcements extending beyond the front and rear edges of the screens and being attached to clevises 88 by means of clevis pins 89. The clevises 88 are, in turn, connected to threaded studs 91 which pass through apertures in brackets 92 and receive nuts 93 on their opposite ends. By tightening nuts 93, the tension of the screens 62, 63 against the arcuate guides 86 is maintained so that the screen is held in position, as shown in Figs. 3 and 4. It will be noted that there is a gap 94 between the periphery of the path of travel of the hammer heads 77 and the screens 62, 63 toward the back of the mill, which gap gradually diminishes toward the front edge 84. This arrangement and narrowing gap 94 insures that the hay and grain are drawn into the mill and forced through the holes in the screens 62, 63 so that they fall into the hopper 56. There is sufficient flexibility in the mounting of the screens in this manner to accommodate foreign matter which may be drawn in with the forage.

In order to remove such foreign material, which may include tramp metal, an anvil 96 is mounted at the forward end of the mill on the inside of the front 21 immediately below the hay opening 22. Anvil 96 extends across both the hay and the grain parts of the mill. The inner surface 97 of the anvil 96 is arcuate and conforms with the curvature of the path of travel of the outer extremity of the hammer heads 77 and in close proximity thereto. The lower surface 98 of the anvil is approximately horizontal. Thus tramp metal and the like carried around in the mill strike the lower surface 98 and are deflected downwardly into the metal trap 99 which comprises the space between the anvil 96 and the downwardly forwardly inclined bracket 101 supporting the forward edge of screens 62, 63. The clean-out holes 32 in the front 21 provide access to the metal trap 99 so that metal can be periodically removed as required.

In operation, hay in proper proportion is placed on the draper 66 and grain in proper proportion in transmitted through the grain conduit 54 from bins 102, 103, respectively. The hay and grain are separately fed on opposite sides of the partition 61 and are carried around by the revolving hammer arms 71 and heads 77 and forced through the screens 62, 63 by reason of the narrowing gap 94 between the path of the periphery of the hammer heads 77 and the screens 62, 63. The hay is thus milled into pieces of approximately 1½ inch length and the grain is milled into particles of ¼ inch diameter or less. The hay and grain discharge from the screens 62, 63 into a common hopper 56, where they are mixed together. Blower 104 draws the mixed forage out of the hopper through conduit 26 and transmits the same into a cyclone 106 from which the forage is dropped out of the air stream and deposited in bin 107 for storage.

Although the foregoing invention has been described in some detail by way of illustration and example for purposes of clarity of understanding, it is understood that certain changes and modifications may be practiced within the spirit of the invention and scope of the appended claims.

What is claimed is:

1. A hay and grain mill comprising a casing, a horizontal shaft rotatable within said casing, a plurality of hammers on said shaft, said hammers being divided into two sections with an axially extending gap between the sections, a vertical partition in the gap between said hammers having the top and side edges abutting the top, front and rear sides of said casing, and a bottom edge terminating above the bottom of said casing, a curved hay screen on one side of said partition below the path of said hammers, a curved grain screen on the opposite side of said partition below the path of said hammers, means for delivering hay to said casing above said hay screen, means for delivering grain to said casing above said grain screen, a hopper in said casing below said screens and said vertical partition to receive discharge from both said screens, and means to seal said partition to said screens and the sides and top of said casing to provide two chamber above said screen completely sealed from internal communication with each other.

2. A hay and grain mill according to claim 1 and wherein said shaft is rotatably mounted with respect to said partition said vertical partition is apertured to receive said shaft, and sealing means around said shaft adjacent the aperture to seal the aperture opening between the sections.

3. A hay and grain mill comprising a casing, a horizontal shaft rotatable within said casing, a plurality of hammers on said shaft, said hammers being divided into two sections with an axially extending gap between the sections, a vertical partition extending from front to rear of said casing and through said gap between said hammers, a curved hay screen on one side of said partition below the path of said hammers, a curved grain screen on the opposite side of said partition below the path of said hammers, said vertical partitions extending downwardly from the top of said casing to a position in contact with said curved hay and grain screens and the front and rear walls of said casing, means to seal said partition along the curved hay and grain screens, front and rear side walls and top of said casing to prevent internal communication between the areas defined on opposite sides of said partition, means for delivering hay to said casing above said hay screen, means for delivering grain to said casing above said grain screen, a common hopper below said screens and said partition to receive discharge from both said screens, and a vent opening to the atmosphere formed in the wall of said casing and communicating with the sections on both sides of said common hopper to admit air thereto from the atmosphere.

4. A hay and grain mill comprising a casing, a horizontal shaft rotatable within said casing, a plurality of hammers on said shaft, said hammers being divided into two sections with an axially extending gap between the sections, a vertical partition extending from front to rear of said casing in the gap between said hammers, a curved hay screen on one side of said partition below the path of said hammers, a curved grain screen on the opposite side of said partition below the path of said hammers, said hay and grain screens positioned substantially above the bottom of said casing to form a common hopper for receiving material from both said screens, means connecting said partition to said hay screen and said grain screen, the front walls, the rear walls and the top of said casing to seal the area in said casing above said grain screen from internal communication with the area in said casing above said hay screen, means for delivering hay to said casing in the area above said hay screen, means for delivering grain to said casing in the area above said grain screen, a vent formed in the wall of said casing and extending across the wall area of the areas on both sides of said partition and the area below said screens to admit air from the atmosphere to each of said two sections and said hopper, and an adjustable flap closure for said vent to adjustably limit the air flow to said two sections and hopper.

References Cited in the file of this patent

UNITED STATES PATENTS

| | | |
|---|---|---|
| 1,306,500 | Rankin | June 10, 1919 |
| 1,374,207 | Jacobson | Apr. 12, 1921 |
| 1,645,770 | Olson | Oct. 18, 1927 |
| 1,730,300 | Seymour | Oct. 1, 1929 |
| 1,828,490 | Clement | Oct. 20, 1931 |
| 2,172,096 | Alfred | Sept. 5, 1939 |
| 2,181,397 | Everett | Nov. 28, 1939 |
| 2,226,741 | Randolph | Dec. 31, 1940 |
| 2,376,361 | Johnston | May 22, 1945 |
| 2,419,773 | Gruendler | Apr. 29, 1947 |
| 2,488,799 | Bonnafoux | Nov. 22, 1949 |
| 2,505,023 | Williamson | Apr. 25, 1950 |
| 2,800,286 | Bryant | July 23, 1957 |

FOREIGN PATENTS

| | | |
|---|---|---|
| 225,345 | Switzerland | Apr. 16, 1943 |
| 444,684 | Great Britain | Mar. 25, 1936 |